Patented July 10, 1928.

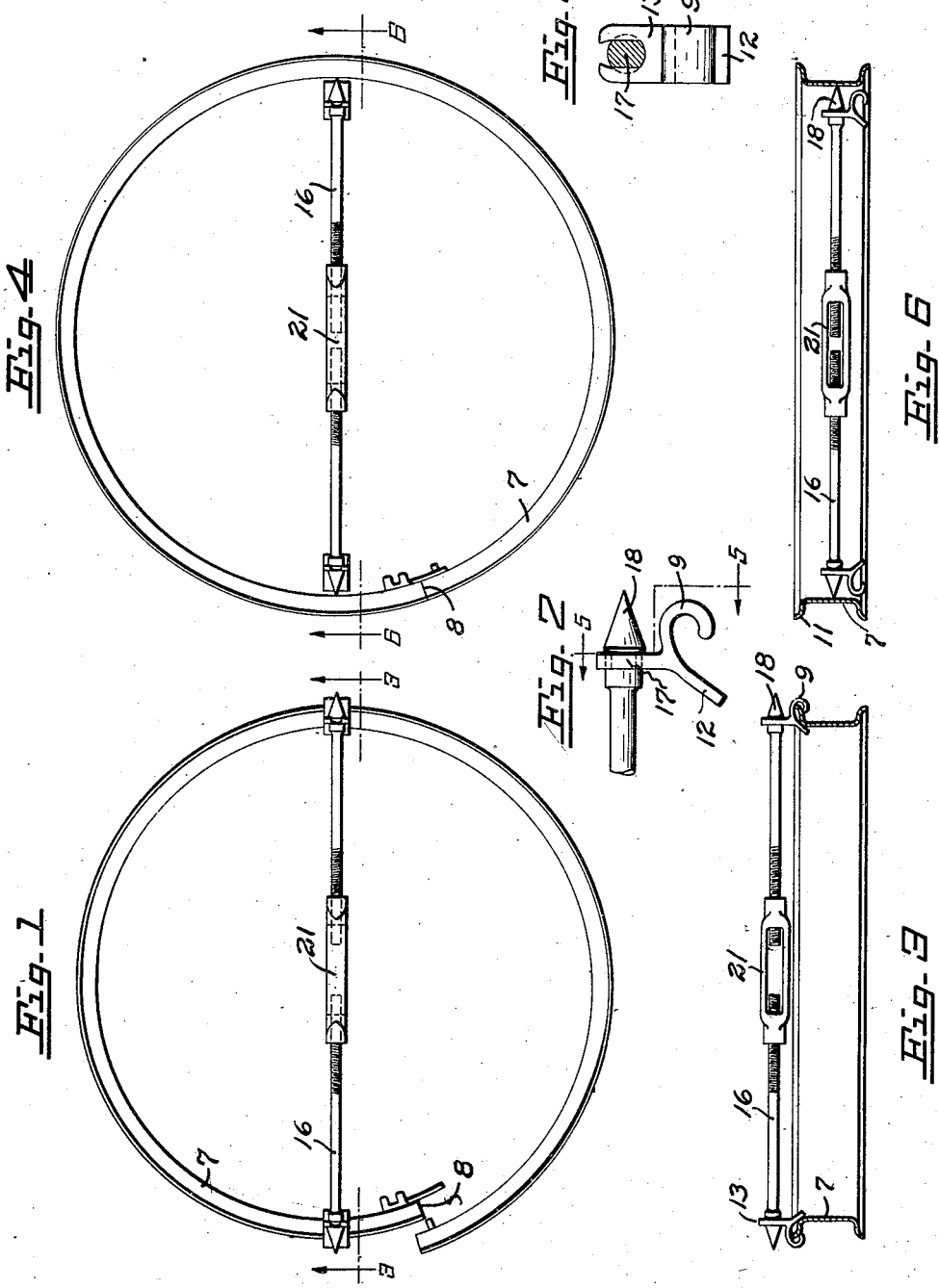

1,676,634

UNITED STATES PATENT OFFICE.

WILLIAM H. CONNER, OF BERKELEY, CALIFORNIA.

TIRE-RIM TOOL.

Application filed June 3, 1926. Serial No. 113,406.

My invention relates to a hand implement and particularly to a tool for contracting or expanding a tire rim.

An object of my invention is the provision of a tool for contracting a tire rim to facilitate the removal of the tire or for expanding a contracted rim to bring the ends adjacent the split into their abutting position.

Another object of my invention is to provide a tire rim tool which is light in weight and sufficiently small to enable it to be added to the usual kit of tools carried in an automobile.

Figure 1 is a plan view showing the tool of my invention applied to a rim.

Figure 2 is a plan view of the anchor head.

Figure 3 is a side elevation showing the device of my invention applied to a rim to contract it, the rim being shown in section so that the application of the tool to the rim is evident.

Figure 4 is a plan view showing my tire rim tool in position to expand a rim.

Figure 5 is a sectional view of the anchor head, the plane of section being indicated by the line 5—5 of Figure 2.

Figure 6 is a side elevation showing the application of the tool for expanding the rim, the rim being shown in section.

Broadly my invention comprises a pair of anchor heads adapted to seat on opposite sides of a rim to provide two substantially parallel cantilever arms. Suitably secured to each of these arms is a rod having its end adjacent the arm provided with a pointed head and its other end threaded into a turn buckle. In this manner the rods are held in aligned position and by twisting the turn buckle, the distance between the anchor heads may be varied to either contract or expand the rim, according to the method of applying the heads to the rim. The whole tool occupies but little space and weighs but a pound or two so that it is readily packed under the seat or in the tool box of a car.

In detail my invention comprises a pair of anchor heads adapted to engage opposite sides of a rim 7 with one of the anchor heads positioned adjacent the split 8. Each anchor head comprises three parts, of which one is a hook 9, adapted to engage the outer flange 11 of the rim. There is also an arm 12 which bears against the inner edge of the rim to support and fix the position of the cantilever arm 13 which extends from the arm and hook portions. In this manner a pair of substantially parallel cantilever arms are provided, which may be almost instantly applied and which extend from approximately diametrically opposed points on the rim, altho the tool will not slip even tho applied considerably off center.

Each cantilever arm is preferably forked at its end so that a yoke is formed, in which the rod 16 is seated, the yoke engaging oppositely disposed grooves which form a neck portion 17 in the pointed head 18 which caps the outer end of the rod. I prefer to use pointed heads on the rods 16 as they resist displacement of the device when it is being used to expand a rim. After seating the neck in the yoke, the ends of the yoke arms are bent toward each other by the blow of a hammer to retain the parts in place, as shown in Figure 5.

The length of the rod 16 is less than the radius of the rim, and the inner end of each rod is threaded into a turn buckle 21. When the anchor heads are hooked over a rim as shown in Figure 1, rotation of the turn buckle draws one of the split ends of the rim inwardly so that the removal of the tire is facilitated. When it is desired to expand the rim into its normal position, one of the pointed heads is seated against the inner surface of the inwardly flexed end of the rim and the other pointed head bears against the opposite inner surface of the rim. The turn buckle is then rotated in the opposite direction to extend the aligned rods, thus forcing the split ends of the rim into abutting position.

When not in use one rod may be unscrewed from the turn buckle to lessen the length of the device so that it can be carried in the usual tool box or tool kit.

I claim:

1. A tire rim tool comprising a pair of anchor heads, each having a hook adapted to engage a side of the tire rim and a leg on said hook adapted to abut against the inner edge of the tire rim, and an arm extending perpendicularly to the plane thereof, a rod having a pointed outer end and a threaded inner end and fixed to each arm, and means connecting the rods for drawing the arms together when the anchor heads are seated on the flange of the rim, and for moving them apart when the pointed heads are bearing against the inner surface of the rim.

2. A tire rim tool comprising a pair of anchor heads adapted to engage opposite sides of the tire rim to form substantially parallel cantilever arms extending from the rim and each arm being forked to form a yoke, a rod engaged intermediate its ends with each arm and provided with oppositely disposed grooves to form a seat for said yoke, and means connecting the rods for moving the arms.

3. A tire rim tool comprising a pair of anchor heads adapted to engage opposite sides of the tire rim to form substantially parallel cantilever arms extending from the rim and each arm being forked to form a yoke, a rod provided with oppositely disposed grooves to form a seat for said yoke, said yoke having its open end partially closed around the rod to prevent disengagement, and means connecting the rods for moving the arms.

4. A tire rim tool comprising a pair of anchor heads; each having a hook adapted to engage a side of the tire rim, a leg adjacent the hook to abut against the inner surface of the rim, and an upwardly extending arm; a rod having a pointed outer end and a threaded inner end and fixed to each arm; and a turn buckle threaded onto the inner ends of said rods.

In testimony whereof, I have hereunto set my hand.

WILLIAM H. CONNER.